(12) United States Patent
Kang et al.

(10) Patent No.: US 12,551,061 B2
(45) Date of Patent: Feb. 17, 2026

(54) JUICE EXTRACTOR SCREW AND JUICE EXTRACTOR

(71) Applicant: HUROM CO., LTD, Gyeongsangnam-do (KR)

(72) Inventors: Byung Ho Kang, Gyeongsangnam-do (KR); Sung Ha Jung, Gyeongsangnam-do (KR)

(73) Assignee: HUROM CO., LTD, Gyeongsangnam-do (KR)

( * ) Notice: Subject to any disclaimer, the term of this patent is extended or adjusted under 35 U.S.C. 154(b) by 648 days.

(21) Appl. No.: 18/015,479

(22) PCT Filed: Jul. 7, 2021

(86) PCT No.: PCT/KR2021/008680
§ 371 (c)(1),
(2) Date: Jan. 10, 2023

(87) PCT Pub. No.: WO2022/010270
PCT Pub. Date: Jan. 13, 2022

(65) Prior Publication Data
US 2023/0284835 A1    Sep. 14, 2023

(30) Foreign Application Priority Data

Jul. 10, 2020 (KR) .......................... 2020200002482

(51) Int. Cl.
*A47J 19/02* (2006.01)
*A47J 43/046* (2006.01)

(52) U.S. Cl.
CPC .......... *A47J 43/046* (2013.01); *A47J 19/023* (2018.08); *A47J 19/025* (2013.01)

(58) Field of Classification Search
CPC ...... A47J 43/046; A47J 19/023; A47J 19/025; A23N 1/00; A23N 1/02
(Continued)

(56) References Cited

U.S. PATENT DOCUMENTS

2009/0049998 A1*  2/2009  Kim ...................... A47J 19/025
                                                        99/510
2012/0291638 A1*  11/2012  Kim ...................... A47J 19/027
                                                        99/501
(Continued)

FOREIGN PATENT DOCUMENTS

CN         103750722 A        4/2014
CN         106308433 B        6/2018
(Continued)

OTHER PUBLICATIONS

International Search Report and Written Opinion dated Oct. 8, 2021 for Application No. PCT/KR2019/008680 filed Jul. 7, 2021.

*Primary Examiner* — Jacob K Ackun
(74) *Attorney, Agent, or Firm* — Dinsmore & Shohl LLP (57) ABSTRACT

A screw for a juicer according to an exemplary embodiment of the present invention with a plurality of screw threads formed on the outer circumferential surface includes a cut-out portion for accommodating the input juice material and primarily compressing the juice material with the plurality of screw threads, and a compression portion for further compressing and crushing the juice material transferred from the cut-out portion, and a rough area having a rough surface is formed in the compression portion.

15 Claims, 8 Drawing Sheets

(58) Field of Classification Search
USPC .......................... 99/509, 510, 511, 512, 513
See application file for complete search history.

(56) References Cited

U.S. PATENT DOCUMENTS

| | | | | |
|---|---|---|---|---|
| 2014/0196614 | A1* | 7/2014 | Kim | A23N 1/02 |
| | | | | 99/513 |
| 2015/0059597 | A1* | 3/2015 | Lee | A47J 19/023 |
| | | | | 99/513 |
| 2015/0164129 | A1* | 6/2015 | Kim | A47J 19/025 |
| | | | | 99/513 |
| 2015/0201668 | A1* | 7/2015 | Chan | A47J 19/025 |
| | | | | 99/513 |
| 2015/0342244 | A1* | 12/2015 | Fouquet | A23L 2/04 |
| | | | | 426/489 |
| 2016/0021924 | A1* | 1/2016 | Kim | A23N 1/02 |
| | | | | 99/513 |
| 2016/0213188 | A1 | 7/2016 | Moon et al. | |

FOREIGN PATENT DOCUMENTS

| | | | |
|---|---|---|---|
| CN | 208030893 U | 11/2018 | |
| KR | 1019960014853 B1 | 10/1996 | |
| KR | 100793852 B1 | 1/2008 | |
| KR | 1020120016532 A | 4/2012 | |
| KR | 200491517 Y1 | 4/2020 | |

\* cited by examiner

| Experimental condition | | | Result of noise measurement | | |
|---|---|---|---|---|---|
| Input voltage / frequency | | Condition | Maximum value | Minimum value | Average value |
| 220V / 60Hz | Apple + carrot juice | Existing screw | 71.8dB | 57.0dB | 65.62dB |
| | | Improved(embossing) screw | 69.0dB | 50.2dB | 59.92dB |
| Calculated value of existing screw noise measurement - improved screw noise | | | 2.8dB low | 6.8dB low | 5.7dB low |

Fig. 9

JUICE EXTRACTOR SCREW AND JUICE EXTRACTOR

CROSS-REFERENCE TO RELATED APPLICATION

This application claims priority to PCT/KR2021/008680 filed on Jul. 7, 2021 which claims the benefit of Korean Patent Application No. 20-2020-0002482 filed in the Korean Intellectual Property Office on Jul. 10, 2020, the entire contents of which are incorporated herein by reference.

BACKGROUND OF THE INVENTION

Field of the Invention

The present invention relates to a screw for juicer and the juicer thereof. More particularly, the present invention relates to a screw for juicer and the juicer thereof that reduces frictional noise by surface treatment on the screw used in the juicer.

Description of the Related Art

Recently, as interest in health has increased at home, the frequency of use of a juicer having a function that allows individuals to directly make and consume juice from juice objects such as vegetables, grains, and fruits is increasing.

As disclosed in Korean Patent Registration No. 0793852, a general operating form of such a juicer is a method of obtaining juice by gently squeezing the input material using the principle of grinding beans with a millstone and squeezing the juice.

The juicer includes a driving unit that provides rotational force, a screw that compresses or crushes the juice object, a mandrel that separates juice and dregs pulverized by the screw, and a juice drum having the screw and the mandrel therein.

The screw performs a function of compressing or crushing the juice object injected into the juice drum while rotating by receiving rotational force from the driving unit. That is, the juice object put into the juice drum is transferred to the lower part while being compressed into a narrow gap between the screw and the mandrel by the screw thread formed on the side of the screw.

However, according to this conventional technology, since the screw has a smooth surface, when the object and the screw are rubbed with high pressure in the compression section between the screw and the mandrel during juice extraction, periodic noise is generated, and this periodic noise is mutually overlapping, a continuous resonant sound is generated.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a screw for a juicer and a juicer thereof capable of reducing resonant sound by roughening the whole or part of the screw surface so that the object and the screw surface are irregularly rubbed during juice extraction.

A screw for a juicer according to an exemplary embodiment of the present invention with a plurality of screw threads formed on the outer circumferential surface includes a cut-out portion for accommodating the input juice material and primarily compressing the juice material with the plurality of screw threads, and a compression portion for further compressing and crushing the juice material transferred from the cut-out portion, and a rough area having a rough surface is formed in the compression portion.

The rough area may be formed by a plurality of inwardly concave grooves between the plurality of screw threads.

The rough area may be formed by corrosion treatment or sandpaper treatment.

The rough area may be provided in a plurality of sections spaced apart from each other along the circumference of the surface of the screw.

The plurality of grooves may be regularly arranged along a direction formed by extending the plurality of screw threads.

The plurality of grooves may be arranged in a row along a direction formed by extending the plurality of screw threads.

The plurality of grooves may be arranged in two rows at a portion where the plurality of screw threads are bent downward from the lower side of the compression portion.

The plurality of grooves may be irregularly arranged between the plurality of screw threads.

The compression portion may be integrally formed with the compression portion at the lower part of the cut-out portion.

Intervals between the plurality of screw threads provided in the compression portion may be formed more densely than those between the plurality of screw threads provided in the cut-out portion.

Upper surfaces of the plurality of screw threads may be inclined downward along the circumferential direction of the screw.

A plurality of screw threads provided in the compression portion may be formed in a shape bent downward from a lower side of the compression portion.

On the lower surface of the compression portion, a plurality of dreg guide jaws protruding outwardly from the radius of the compression portion may be formed in a circumferential direction of the compression portion.

Meanwhile, a juicer according to an exemplary embodiment of the present invention includes a screw, a housing with an open upper surface, a dregs outlet formed on one side of the lower end, and a driving unit formed therein, and a mandrel disposed between the screw and the housing and forming a gap with the screw to pass the extracted juice, and the screw is provided inside the housing and rotates by receiving rotational force from the driving unit to compress and crush the juice material injected into the housing through interaction with the mandrel.

The juicer according to an exemplary embodiment of the present invention may further include a brush disposed between the housing and the mandrel and rotating to sweep the side of the mandrel or the housing.

Advantageous Effects

According to an exemplary embodiment of the present invention, a screw for a juicer may reduce noise caused by a resonance phenomenon by roughening all or part of the surface so that the material and the surface of the screw are irregularly rubbed during juice extraction.

DETAILED DESCRIPTION OF THE EMBODIMENTS

An exemplary embodiment of the present invention will hereinafter be described in detail with reference to the accompanying drawings.

Throughout the specification, unless explicitly described to the contrary, the word "comprise", and variations such as "comprises" or "comprising", will be understood to imply the inclusion of stated elements but not the exclusion of any other elements. For convenience of description, directions closer to the ground (lower side of the drawing) are referred to as 'lower side', 'lower surface', 'lower end' and similar names, and directions away from the ground (upper side of the drawing) are referred to as 'upper side', 'upper surface', 'upper end', and similar names. And parts marked with the same reference numerals throughout the specification mean the same or similar components. In addition, in the accompanying drawings, contents that deviate from the gist of the present invention are briefly described or omitted, and the description thereof is also briefly described or omitted.

Figure 1:
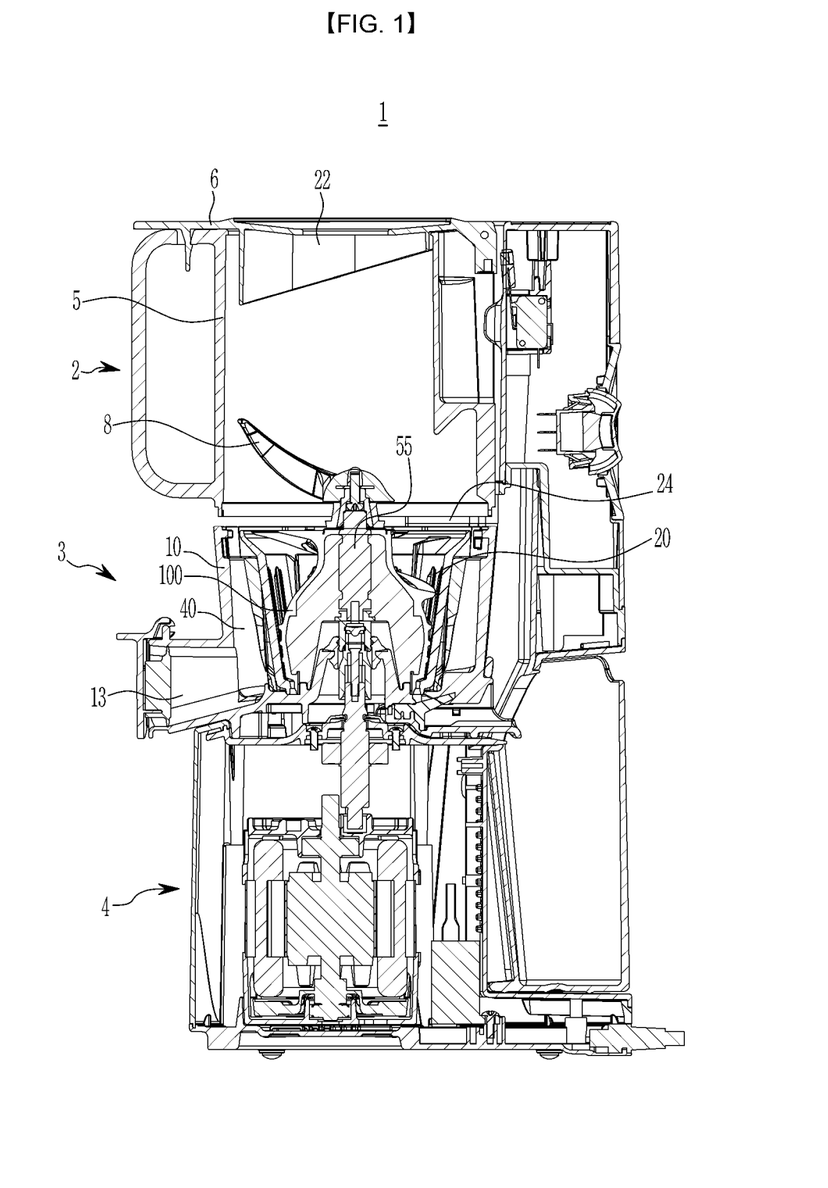
FIG. 1 is a partial cross-sectional view of a juicer equipped with a screw according to an exemplary embodiment of the present invention.

FIG. 1 is a partial cross-sectional view of a juicer equipped with a screw according to an exemplary embodiment of the present invention. The juicer illustrated in FIG. 1 is an exemplary embodiment, and the technical spirit of the present invention is not limited to the juicer illustrated in this specification and may be applied to various juicers.

Figure 2:
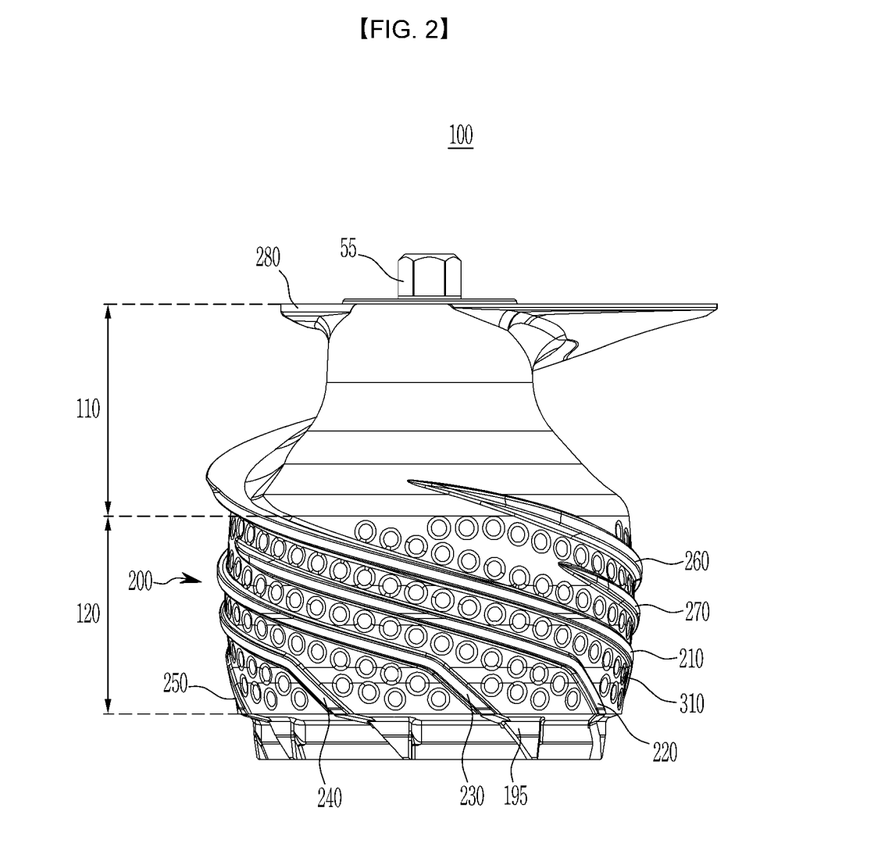
FIG. 2 is a front view of a screw according to an exemplary embodiment of the present invention.
Figure 3:
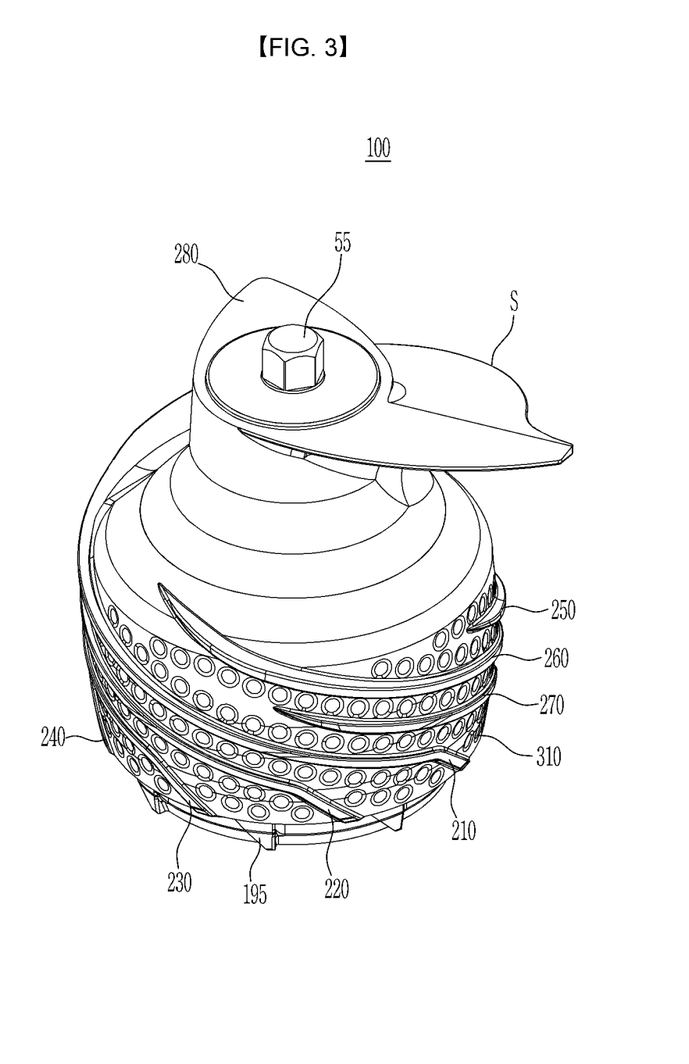
FIG. 3 is a perspective view of a screw according to an exemplary embodiment of the present invention.

Referring to FIG. 1 to FIG. 3, a juicer 1 according to an exemplary embodiment of the present invention includes a crushing unit 2, a juice extraction unit 3 provided under the crushing unit 2, and a driving unit 4 provided under the juice extraction unit 3.

The crushing unit 2 accommodates and crushes raw materials to be juiced, and the finely crushed raw materials are put into the extraction unit 3 to be juiced. The crushing unit 2 includes a material container 5, and raw materials are introduced through a lid 6 provided at an upper opening of the material container 5. A material inlet 22 may be provided in the lid 6, and raw materials may be introduced through the material inlet 22.

A crushing blade 8 connected to a screw shaft 55 provided in the extraction unit 3 is provided at the center of the bottom surface of the material container 5. As the screw shaft 55 rotates, the crushing blades 8 rotate together, and raw materials are crushed by the crushing blades 8. In addition, finely crushed raw materials are put into the extraction unit 3 under the material container 5 through the crushing material inlet 24 formed on the bottom surface of the material container 5.

The extraction unit 3 includes a housing 10, a mandrel 20, a brush 40, and a screw 100.

The housing 10 is formed in a columnar shape with an open upper surface, and a juice outlet (not shown) and a dregs outlet 13 may be formed at a lower end thereof.

The mandrel 20 is disposed between the housing 10 and the screw 100. The mandrel 20 forms a narrow gap with the screw 100, and as the screw 100 rotates, the juice object (crushing material) is squeezed into the narrow gap to extract juice.

A plurality of net holes may be formed on the side of the mandrel 20 so that juice generated by the screw 100 may be discharged to the outside. The dregs of the mandrel 20 do not pass through the upper net holes, but are pushed down and discharged through the dregs outlet 13, and the juice passing through the mandrel may be discharged through the juice outlet.

In order to use the juicer 1 only for crushing purposes, the side of the mandrel 20 may be formed without a net hole. In this case, the juice squeezed and crushed by the mandrel 20 and the screw 100 are not separated into juice and dregs, but are all discharged through the juice outlet or the dregs outlet 13. The crushing mandrel 20 can be used to obtain food such as ice cream, smoothie, or sherbet by injecting ingredients such as frozen fruits, chocolate, frozen confectionery, ice, and beverages together.

The brush 40 may be disposed between the housing 10 and the mandrel 20, and rotates by receiving rotational force from the driving unit 4. The brush 40 sweeps down the surface of the mandrel 20 or the housing 10, and the juice attached to the mandrel 20 or the housing 10 is smoothly transferred to the lower part.

In addition, when the user wants to clean the inside of the housing 10, the cleaning liquid or water may be injected into the housing 10 and the brush 40 may be operated. At this time, the brush 40 can completely remove juice or dregs adhering to the mandrel 20 or the housing 10.

FIG. 2 is a front view of a screw according to an exemplary embodiment of the present invention, and FIG. 3 is a perspective view of a screw according to an exemplary embodiment of the present invention. Hereinafter, the screw 100 will be described in more detail with reference to FIGS. 2 and 3.

The screw 100 of the extraction unit 3 rotates by receiving rotational force from the driving unit 4, and performs a function of compressing or crushing the crushing material. To this end, the central portion of the screw 100 is provided with a screw shaft 55 that rotates in engagement with the driving unit 4, and a plurality of screw threads 200 are formed on the outer circumferential surface of the screw 100 at a portion in contact with the mandrel 20. By the screw thread 200, the crushed material is compressed into a narrow gap between the screw 100 and the mandrel 20 and transported to the lower side thereof.

The screw 100 according to an exemplary embodiment of the present invention can be largely divided into a cut-out portion 110 and a compression portion 120.

The cut-out portion 110 is formed to be adjacent to the crushing material inlet 24 into which the crushing material is input, and typically has a wide gap between the screw threads 200 to accommodate more crushing material. The crushed material introduced into the cut-out portion 110 is transferred downward by the screw thread 200.

The compression unit 120 further compresses the crushed material transferred from the above cut-out portion 110 to extract juice. To this end, the interval of the screw threads 200 formed in the compression portion 120 is more dense. In addition, the screw thread 200 formed in the compression portion 120 is formed in a shape bent downward from the lower side to smoothly discharge the dregs from the top to the bottom of the compression portion 120.

In addition, a plurality of dregs guide jaws 195 protruding radially outward are formed on the lower surface of the compression portion 120 along the circumferential direction. As the screw 100 rotates, the dregs guide jaw 195 rotates together, and sweeps the dregs that are pressurized downward without passing through the net hole of the mandrel 20 in the compression portion 120. As such, the dregs guide jaw 195 formed on the lower surface of the compression portion 120 completely removes dregs caught between the lower portion of the compression portion 120 and the mandrel 20 to further increase juice extraction efficiency.

Meanwhile, according to an exemplary embodiment of the present invention, the screw thread 200 formed in the screw 100 includes a first screw thread 210, a second screw thread 220, a third screw thread 230, and a fourth screw thread 240, a fifth screw thread 250, a sixth screw thread 260, a seventh screw thread 270, and an eighth screw thread 280. The number of threads above is set to 8, but is not limited thereto.

The eighth screw thread 280 is located at the top of the screw 100 and may be formed to be coplanar with the top of the first screw thread 210. The eighth screw thread 280 is formed shorter than the top of the first screw thread 210, so that the crushing material introduced into the extraction portion 3 through the crushing material inlet 24 flows naturally from the top of the screw 100 to the bottom.

Meanwhile, a plurality of grooves (embossing) 310 are formed in a concave circular shape on the surface of the screw 100 between the threads of the compression portion 120. The plurality of grooves 310 may be formed by being regularly arranged between each screw thread along a direction in which the screw thread extends. The plurality of grooves 310 have a constant diameter and depth, and the diameter and depth can be variously changed according to the diameter of the screw 100 and the intervals of the plurality of screw threads.

A plurality of grooves 310 may be arranged in a row between respective threads. In addition, since the interval between the screw threads is wide in the portion formed in the shape bent downward from the lower side of the screw thread, the plurality of grooves 310 may be arranged in two rows along the direction in which the screw thread extends. By the formation of such a groove 310, by causing irregular friction when the material and the screw 100 are rubbed at high pressure in the compression portion between the screw 100 and the mandrel 20 during juice extraction, resonance sound due to overlapping of periodic noise can be reduced.

Figure 4:
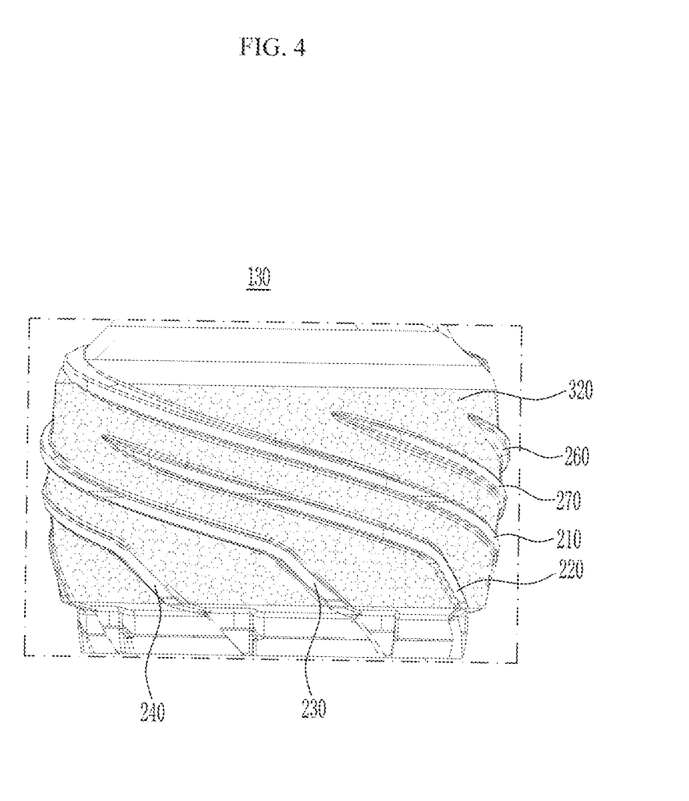
FIG. 4 is a front view of a screw according to another exemplary embodiment of the present invention.

FIG. 4 is a front view of a screw according to another exemplary embodiment of the present invention.

As shown in FIG. 4, a plurality of irregularly arranged grooves 320 may be formed on the surface of the screw 130 between the threads of the compression portion 120. In this case, the plurality of irregularly arranged grooves 320 may be formed smaller than the diameter and depth of the plurality of regularly arranged grooves 310 according to the embodiment shown in FIG. 3. In addition, the diameter and depth of the plurality of grooves 320 may be variously changed according to the diameter of the screw 130 and the intervals of the plurality of screw threads 200. That is, the diameters and depths of the plurality of grooves 320 may be the same as or different from each other.

Figure 5:
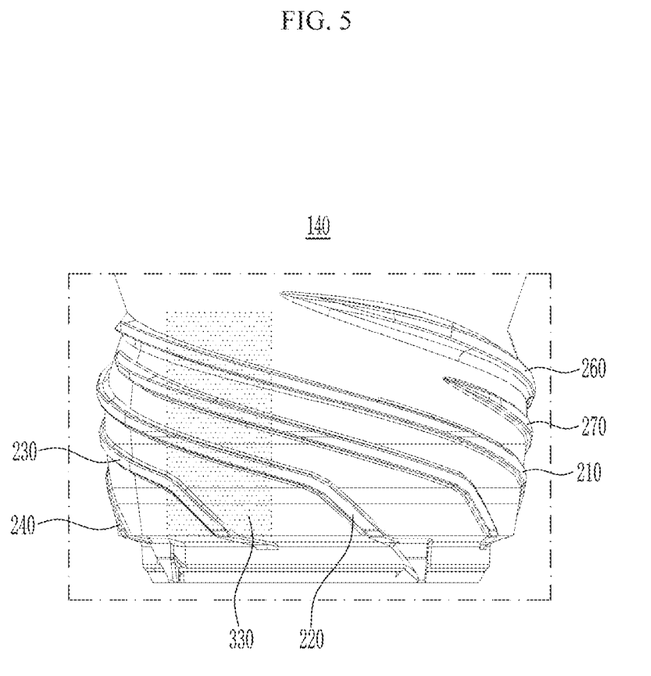
FIG. 5 is a front view of a screw according to another exemplary embodiment of the present invention.

FIG. 5 is a front view of a screw according to another exemplary embodiment of the present invention.

Referring to FIG. 5, the surface of the screw 140 may be roughened by corrosion treatment or sandpaper treatment in the predetermined section 330 of the compression portion 120. Due to the smooth surface of the existing screw, the juice material constantly rubbed regularly between the screw surface and the mandrel, resulting in strong noise. As shown in FIG. 5, by forming the predetermined section 330 of the compression portion of the screw 140 as a rough surface, continuous friction of the smooth surface during rotation of the screw 140 can be avoided and noise can be reduced. The section 330 by such corrosion treatment or sandpaper treatment may be formed in several sections along the circumference of the surface of the screw 140.

Figure 6:
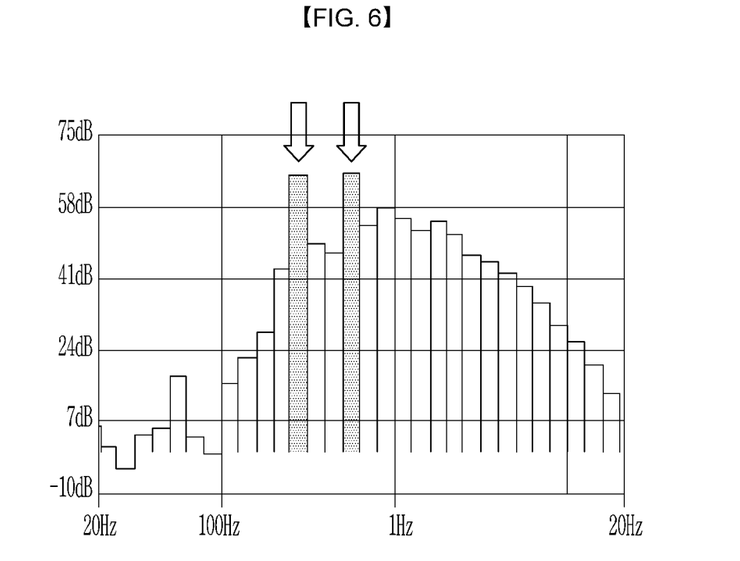
FIG. 6 is a graph showing noise measurement results for each frequency band before applying a screw according to an exemplary embodiment of the present invention.
Figure 7:
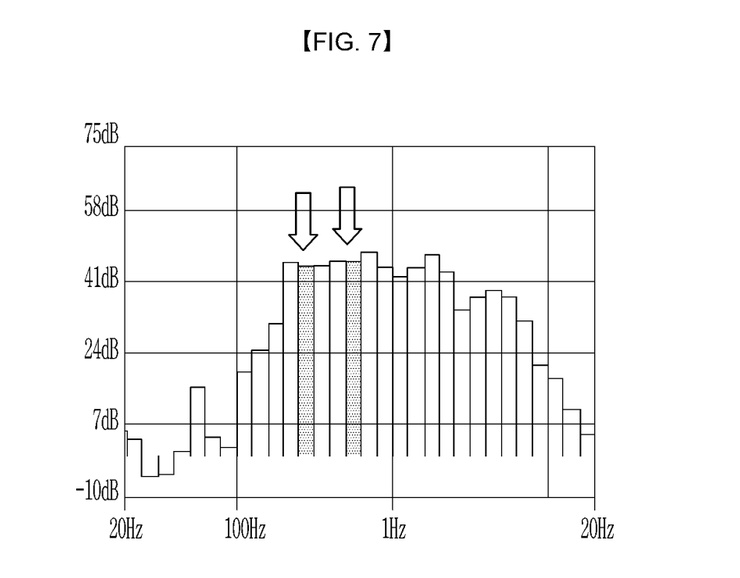
FIG. 7 is a graph showing noise measurement results for each frequency band after applying a screw according to an exemplary embodiment of the present invention.

FIG. 6 is a graph showing noise measurement results for each frequency band before applying a screw according to an exemplary embodiment of the present invention, and FIG. 7 is a graph showing noise measurement results for each frequency band after applying a screw according to an exemplary embodiment of the present invention.

Referring to FIG. 6 and FIG. 7, the result of measuring the maximum noise when the juicer 1 is operated after the diced apple is put into the juicer and noise is generated during the juice operation is shown. The maximum noise of about 70.8 dB was generated in the frequency bands of about 500 Hz and about 800 Hz when apples were squeezed using a juicer using an existing screw. However, when an apple is squeezed using the juicer 1 to which the screw 100 according to an embodiment of the present invention is applied, a maximum noise of about 57.4 dB is generated in a frequency band of about 500 Hz and about 800 Hz. It can be confirmed that the maximum noise is rapidly reduced when the juicer 1 to which the screw 100 of the present invention is applied is used.

Figure 8:
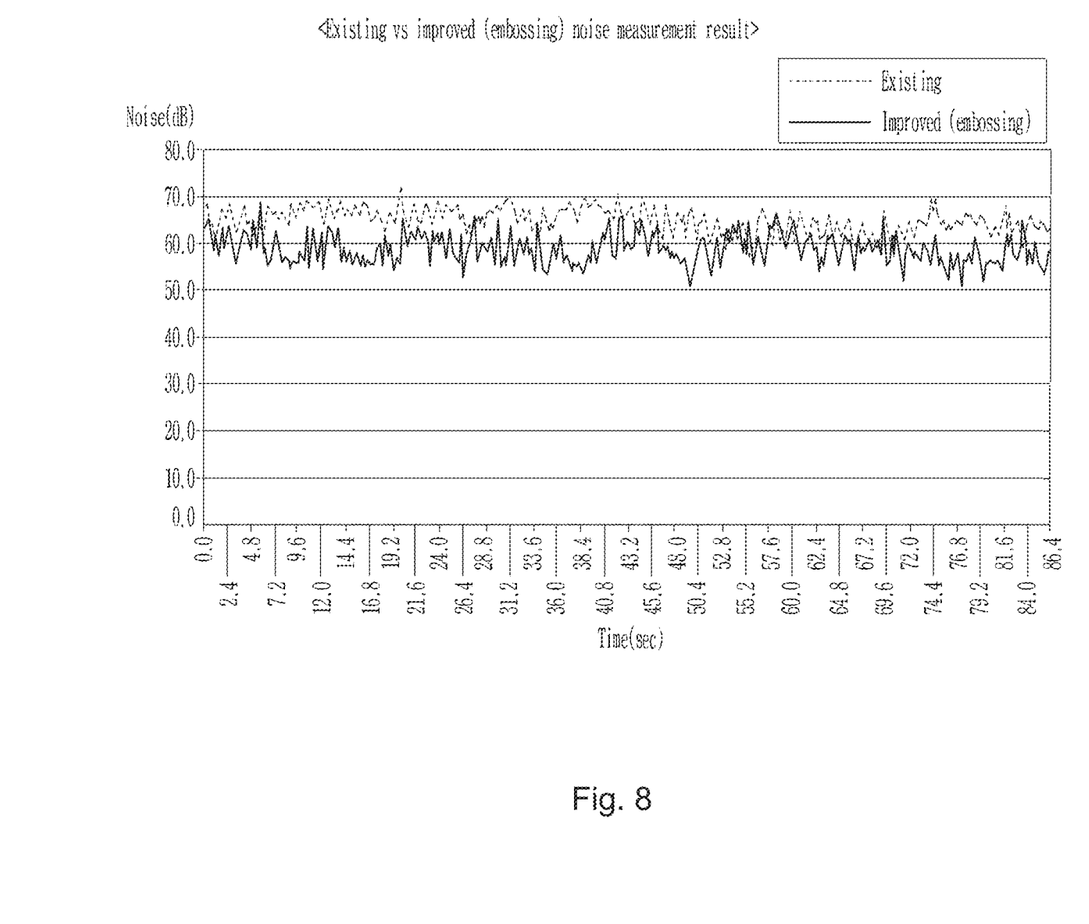
FIG. 8 is a graph showing noise measurement results over time when a screw according to an exemplary embodiment of the present invention is applied and when an existing screw is applied.
Figure 9:
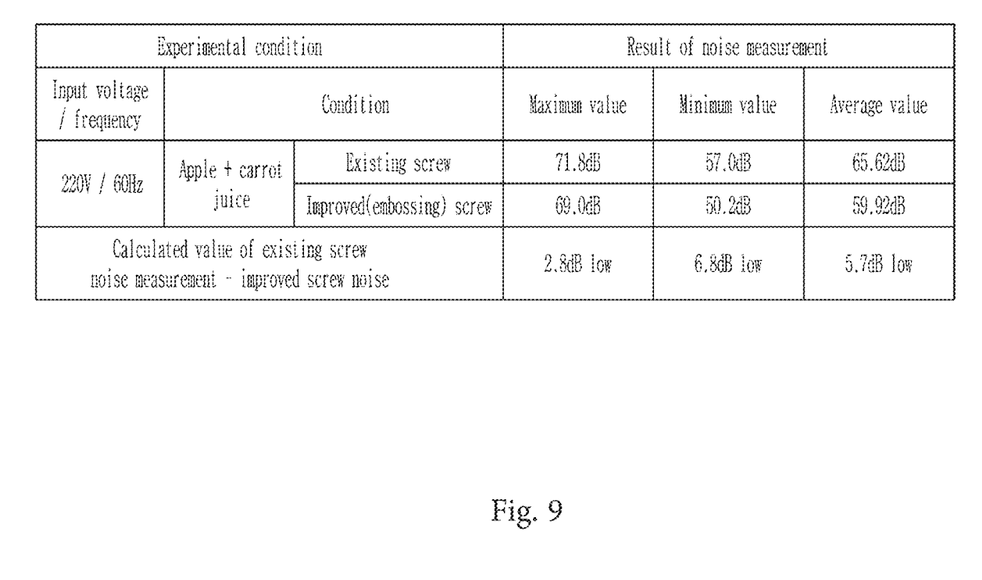
FIG. 9 is a table showing improved noise measurement results when a screw according to an exemplary embodiment of the present invention is applied compared to when an existing screw is applied.

FIG. 8 is a graph showing noise measurement results over time when a screw according to an exemplary embodiment of the present invention is applied and when an existing screw is applied, and FIG. 9 is a table showing improved noise measurement results when a screw according to an exemplary embodiment of the present invention is applied compared to when an existing screw is applied.

Referring to FIG. 8 and FIG. 9, after the apples and carrots were put into the juicer 1 together, the juicer 1 was operated to show the noise measurement results over time. The noise was measured between about 50 dB and about 70 dB in the 60 Hz frequency band. As shown in FIG. 8, it can be confirmed that the noise level is reduced when the screw 100 according to an exemplary embodiment of the present invention is applied compared to the noise generated by the juicer when the existing screw is applied.

And, when the existing screw was applied, the maximum value of noise was measured as about 71.8 dB, the minimum value as about 57.0 dB, and the average value as about 65.6 dB. When the screw 100 according to an exemplary embodiment of the present invention is applied, the maximum value of noise was measured as about 69.0 dB, the minimum value as about 50.2 dB, and the average value as about 59.9 dB. According to this, when the screw 100 according to an exemplary embodiment of the present invention is applied, the maximum value of noise is reduced by about 2.8 dB, the minimum value by about 6.8 dB, and the average value by about 5.7 dB, compared to the case where the existing screw is applied.

Like this, according to an exemplary embodiment of the present invention, a screw for a juicer may reduce noise caused by a resonance phenomenon by roughening all or part of the surface so that the material and the surface of the screw are irregularly rubbed during juice extraction.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

Industrial Applicability

According to an exemplary embodiment of the present invention, a screw for a juicer may reduce noise caused by a resonance phenomenon by roughening all or part of the surface so that the material and the surface of the screw are irregularly rubbed during juice extraction.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A screw for a juicer with a plurality of screw threads formed on the outer circumferential surface comprising:
   a cut-out portion accommodating the input juice material and primarily compressing the juice material with the plurality of screw threads, and a compression portion further compressing and crushing the juice material transferred from the cut-out portion, and
   a rough area having a rough surface is formed in the compression portion.

2. The screw for a juicer of claim 1, wherein:
   the rough area is formed by a plurality of inwardly concave grooves between the plurality of screw threads.

3. The screw for a juicer of claim 1, wherein:
   the rough area is formed by corrosion treatment or sandpaper treatment.

4. The screw for a juicer of claim 2, wherein:
   the rough area is provided in a plurality of sections spaced apart from each other along the circumference of the surface of the screw.

5. The screw for a juicer of claim 2, wherein:
   the plurality of grooves are regularly arranged along a direction formed by extending the plurality of screw threads.

6. The screw for a juicer of claim 2, wherein:
   the plurality of grooves are arranged in a row along a direction formed by extending the plurality of screw threads.

7. The screw for a juicer of claim 2, wherein:
   the plurality of grooves are arranged in two rows at a portion where the plurality of screw threads are bent downward from the lower side of the compression portion.

8. The screw for a juicer of claim 2, wherein:
   the plurality of grooves are irregularly arranged between the plurality of screw threads.

9. The screw for a juicer of claim 2, wherein:
   the compression portion is integrally formed with the compression portion at the lower part of the cut-out portion.

10. The screw for a juicer of claim 2, wherein:
    intervals between the plurality of screw threads provided in the compression portion are formed more densely than those between the plurality of screw threads provided in the cut-out portion.

11. The screw for a juicer of claim 2, wherein:
    upper surfaces of the plurality of screw threads are inclined downward along the circumferential direction of the screw.

12. The screw for a juicer of claim 11, wherein:
    a plurality of screw threads provided in the compression portion are formed in a shape bent downward from a lower side of the compression portion.

13. The screw for a juicer of claim 2, wherein:
    on the lower surface of the compression portion, a plurality of dreg guide jaws protruding outwardly from the radius of the compression portion are formed in a circumferential direction of the compression portion.

14. A juicer, comprising:
    a screw according to claim 1;
    a housing with an open upper surface, a dregs outlet formed on one side of the lower end, and a driving unit formed therein; and
    a mandrel disposed between the screw and the housing and forming a gap with the screw to pass the extracted juice, and
    the screw is provided inside the housing and rotates by receiving rotational force from the driving unit to compress and crush the juice material injected into the housing through interaction with the mandrel.

15. A juicer of claim 14, further comprising:
    a brush disposed between the housing and the mandrel and rotating to sweep the side of the mandrel or the housing.

* * * * *